US011040595B2

(12) United States Patent
 Kim et al.

(10) Patent No.: US 11,040,595 B2
(45) Date of Patent: Jun. 22, 2021

(54) AIR CONDITIONER FOR VEHICLE

(71) Applicant: Hanon Systems, Daejeon (KR)

(72) Inventors: Tae Wan Kim, Daejeon (KR); Yong Eun Seo, Daejeon (KR); Jeong Hun Seo, Daejeon (KR); Myoung Jun Kim, Daejeon (KR); Jong Gon Lee, Daejeon (KR); Tae Gun Lee, Daejeon (KR)

(73) Assignee: Hanon Systems, Daejeon (KR)

( * ) Notice: Subject to any disclaimer, the term of this patent is extended or adjusted under 35 U.S.C. 154(b) by 8 days.

(21) Appl. No.: 16/437,836

(22) Filed: Jun. 11, 2019

(65) Prior Publication Data
US 2019/0375272 A1    Dec. 12, 2019

(30) Foreign Application Priority Data
Jun. 11, 2018    (KR) .................. 10-2018-0066594

(51) Int. Cl.
*B60H 1/00*        (2006.01)
*B60H 1/12*        (2006.01)
(Continued)

(52) U.S. Cl.
CPC .......... *B60H 1/00842* (2013.01); *B60H 1/12* (2013.01); *B60H 2003/026* (2013.01); *B60S 1/54* (2013.01)

(58) Field of Classification Search
CPC ............ B60H 1/00814; B60H 1/00835; B60H 1/00842; B60H 1/2215; B60H 1/00664;
(Continued)

(56) References Cited

U.S. PATENT DOCUMENTS 6,045,444 A * 4/2000 Zima .................. B60H 1/00028
                                                    165/103
6,319,112 B2 * 11/2001 Komowski ........ B60H 1/00685
                                                    454/139
(Continued)

FOREIGN PATENT DOCUMENTS

DE         69906205 T2     9/2003
DE      102008021015 A1   10/2008
(Continued)

*Primary Examiner* — Frantz F Jules
*Assistant Examiner* — Jason N Thompson
(74) *Attorney, Agent, or Firm* — Norton Rose Fulbright US LLP; James R. Crawford (57) ABSTRACT

An air conditioner for a vehicle which can reduce ventilation resistance and secure a sufficient cross-sectional area of an air outlet to prevent deterioration in air volume. The air conditioner includes: an air-conditioning case having an air passageway formed therein and a plurality of air outlets formed at an exit thereof, and at least one heat exchanger disposed in the air passageway of the air-conditioning case to exchange heat with air passing through the air passageway, wherein the air outlet includes a center vent for discharging air-conditioned wind toward the center of a vehicle width and a side vent for discharging the air-conditioned wind toward the side of the vehicle width, and one between the center vent and the side vent is arranged in an upper side of the air-conditioning case, and the other is arranged in one side of the air-conditioning case in a back-and-forth direction of the vehicle.

9 Claims, 8 Drawing Sheets (51) Int. Cl.
 *B60H 3/02* (2006.01)
 *B60S 1/54* (2006.01)
(58) Field of Classification Search
 CPC ...... B60H 2001/00707; B60H 1/00821; B60H 1/00671; B60H 1/100721
 USPC .................................................. 165/203, 204
 See application file for complete search history.

(56) References Cited

U.S. PATENT DOCUMENTS

| | | | | |
|---|---|---|---|---|
| 6,871,696 | B2* | 3/2005 | Aoki ................. | B60H 1/00285 165/203 |
| 7,228,689 | B2* | 6/2007 | Kadle ................. | B60H 1/0005 62/115 |
| 7,905,278 | B2* | 3/2011 | Sato ................. | B60H 1/00035 165/204 |
| 2001/0004015 | A1* | 6/2001 | Bendell ............. | B60H 1/00064 165/203 |
| 2002/0129933 | A1* | 9/2002 | Ozeki ................. | B60H 1/0005 165/203 |
| 2004/0194948 | A1* | 10/2004 | Shibata ............. | B60H 1/00064 165/204 |
| 2005/0205247 | A1* | 9/2005 | Ezaki ................. | B60H 1/00064 165/204 |
| 2010/0224253 | A1* | 9/2010 | Azar ................. | B60H 1/00678 137/1 |
| 2013/0344791 | A1 | 12/2013 | Wang et al. | |
| 2015/0306935 | A1* | 10/2015 | Shichiken .......... | B60H 1/00685 165/47 |
| 2017/0253107 | A1 | 9/2017 | Castiglioni et al. | |

FOREIGN PATENT DOCUMENTS

| | | |
|---|---|---|
| DE | 102014113590 A1 | 3/2016 |
| DE | 112015002457 T5 | 2/2017 |
| JP | 2000071748 A * | 3/2000 |

* cited by examiner

FIG. 1

PRIOR ART

FIG. 2

PRIOR ART

AIR CONDITIONER FOR VEHICLE

This application claims priority from Korean Patent Application No. 10-2018-0066594 filed on Jun. 11, 2018. The entire contents of these applications are incorporated herein by reference in their entirety.

BACKGROUND OF THE INVENTION

Field of the Invention

The present invention relates to an air conditioner for a vehicle, and more particularly, to an air conditioner for a vehicle, which has an indirect vent for blowing wind to a space to perform air-conditioning as well as a defrost vent and a face vent.

Background Art

In general, an air conditioner for a vehicle is a car part, which is installed in a vehicle for the purpose of cooling or heating the interior of the vehicle in the summer season or the winter season or removing frost from a windshield in the rainy season or the winter season to thereby secure a driver's front and rear visual fields. Such an air conditioner typically includes a heating device and a cooling device together, so that it can heat, cool or ventilate the interior of the vehicle through the steps of selectively introducing the indoor air or the outdoor air into the air conditioner, heating or cooling the introduced air, and blowing the heated or cooled air into the vehicle.

Figure 1:
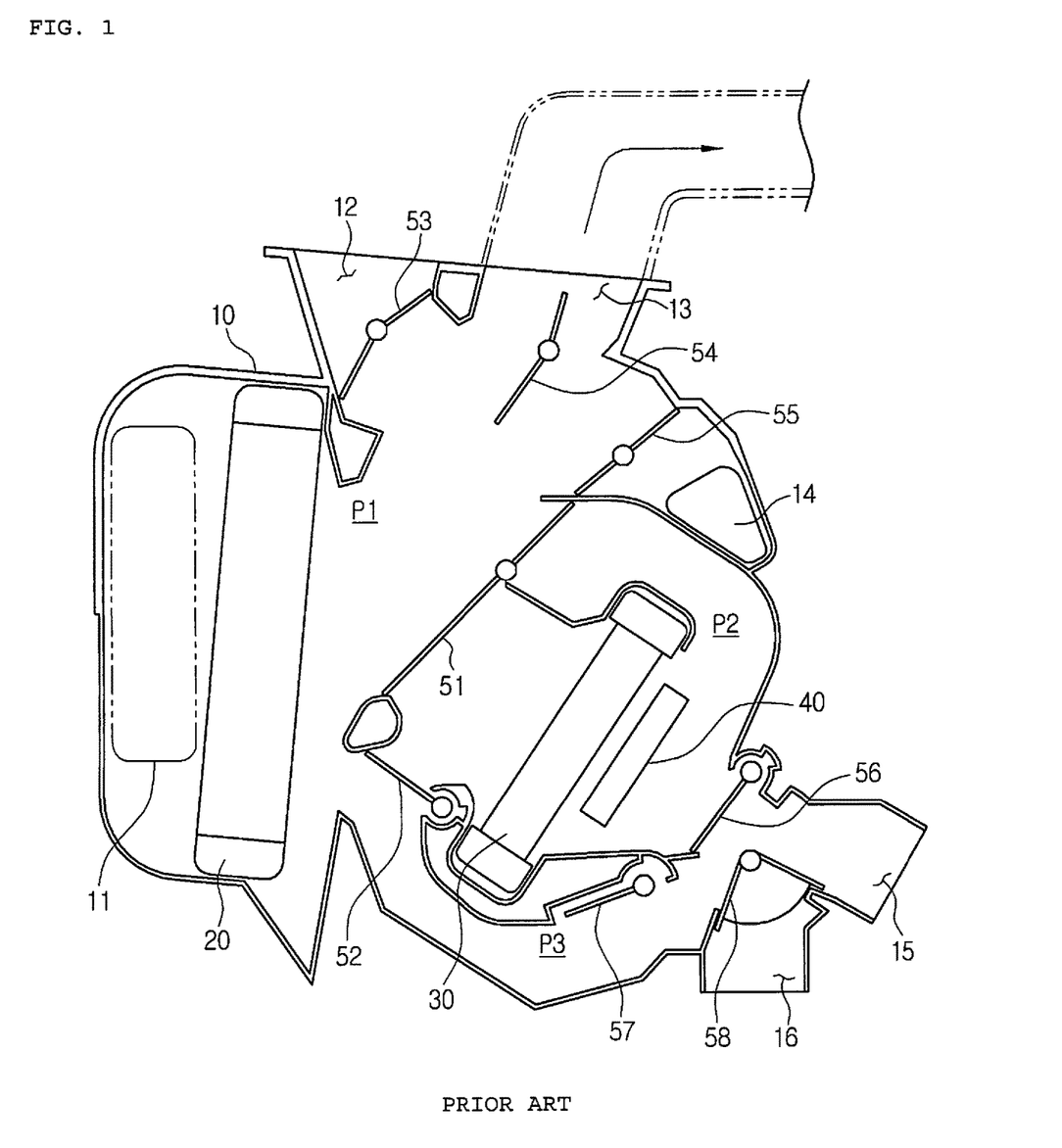
FIG. 1 is a sectional view of a conventional air conditioner for a vehicle.

FIG. 1 is a sectional view of a conventional air conditioner for a vehicle. As shown in FIG. 1, the air conditioner for a vehicle includes an air-conditioning case 10, an evaporator 20, a heater core 30, a front seat temperature adjusting door 51, and a front seat mode door.

The air-conditioning case 10 includes an air inlet 11 and an air outlet, and an air passageway formed therein. A blower unit is connected to the air inlet 11 so that indoor air or outdoor air is selectively introduced into the air passageway formed inside the air-conditioning case 10. The air outlet includes a defrost vent 12, a face vent 13, a floor vent 114, a console vent 15, and a rear floor vent 16. The air passageway inside the air-conditioning case 10 includes a front seat cold air passageway P1, a warm air passageway P2, and a rear seat cold air passageway P3.

The evaporator 20 is a heat exchanger for cooling and cools air passing through the evaporator 20. The heater core 30 is a heat exchanger for heating and heats air passing through the heater core 30. The heater core 30 is arranged in the warm air passageway P2 which is located downstream of the evaporator 20 in an air flow direction. An electric heater 40, such as a PTC heater, may be further disposed in the warm air passageway P2. The front seat temperature adjusting door 51 is arranged between the evaporator 20 and the heater core 30 in order to adjust the degree of opening of the warm air passageway P2 passing the heater core 30 and the degree of opening of the cold air passageways P1 and P3 bypassing the heater core 30. The front seat mode door includes a defrost door 53, a vent door 54, and a floor door 55.

The rear seat air passageway includes the rear seat cold air passageway P3 that the air passing through the evaporator 20 bypasses the heater core 30 and a warm air passageway passing through the heater core 30. The warm air passageway of the rear seat air passageway is used together with the warm air passageway P2 of the front seat air passageway. That is, some of air passing through the heater core 30 and flowing in the warm air passageway P2 moves upwardly, and then, is discharged to at least one between the defrost vent 12, the face vent 13, and the floor vent 114, and the remainder of the air moves downwardly, and then, is discharged to at least one between the console vent 15 and the rear seat floor vent 16. A rear seat mode door 58 is disposed in the rear seat air passageway to adjust the degree of opening of the console vent 15 and the degree of opening of the rear seat floor vent 16.

The air-conditioning case 10 has a rear seat temperature adjusting door 52, an auxiliary rear seat temperature adjusting door 56, and a rear seat on-off door 57 which are disposed in the air-conditioning case 10. The rear seat temperature adjusting door 52 is disposed between the evaporator and the heater core 30 in order to adjust the degree of opening of a passageway flowing to the warm air passageway P2 and a passageway flowing to the rear seat cold air passageway P3. The auxiliary rear seat temperature adjusting door 56 is arranged downstream of the heater core 30 in the air flow direction in order to adjust the degree of opening of a passageway flowing to the rear seat air outlet. The rear seat on-off door 57 adjusts the degree of opening of the rear seat cold air passageway P3.

Figure 2:
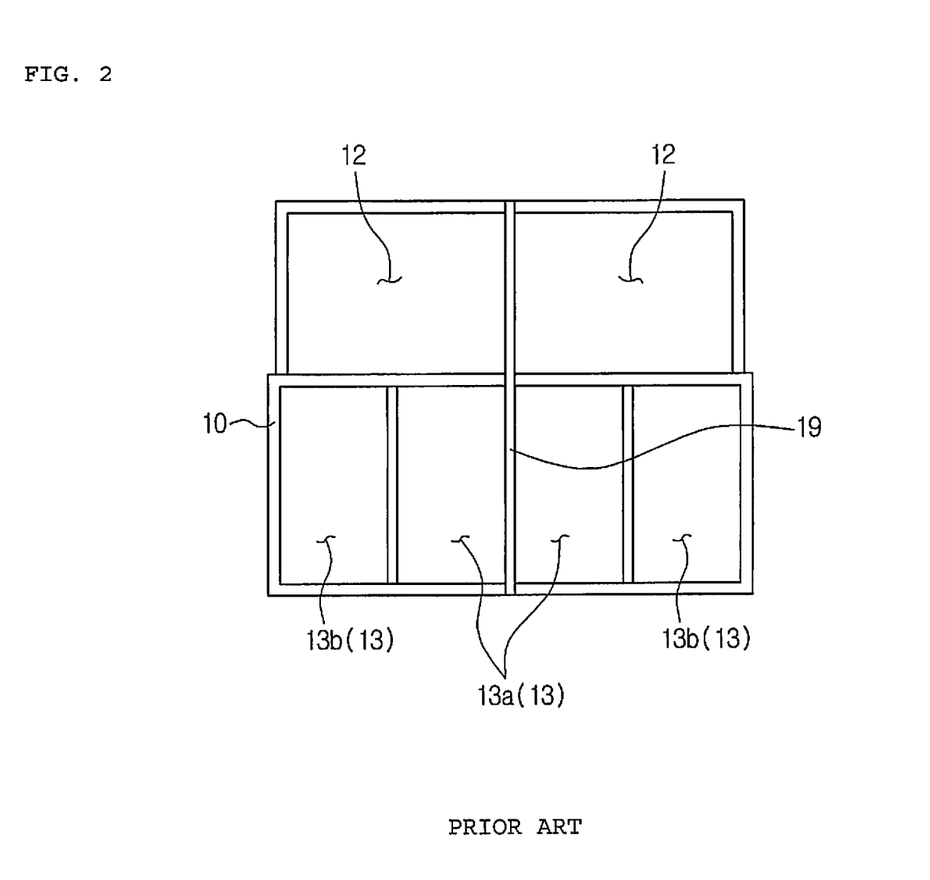
FIG. 2 is a plan view of the conventional air conditioner for a vehicle.

Moreover, FIG. 2 is a plan view of the conventional air conditioner for a vehicle. Referring to FIG. 2, the face vent includes a center vent 13a which sends air-conditioned air toward the center of a vehicle width and a side vent 13b which sends air-conditioned air toward the side of the vehicle. Furthermore, the air-conditioning case 10 has a separator 19 disposed at the center thereof in order to perform independent air-conditioning in a vehicle width direction.

As described above, the conventional air conditioner for a vehicle has a disadvantage in that a flow path is sharply bent so that the air discharged upwardly through the center vent faces the front of the interior of the vehicle. That is, because a center vent grill is located at the front of a vehicle panel, it is inevitable that the air flow path is sharply bent. Therefore, the conventional air conditioner for a vehicle is disadvantageous in ventilation resistance.

Additionally, the conventional air conditioner for a vehicle has a further disadvantage in that it is difficult to secure a cross-sectional area of the air outlet and the vehicle width size is increased in order to secure the cross-sectional area since an outlet of the center vent 13a and an outlet of the side vent 13b are formed on one side and a center vent path and a side vent path are divided on one side. Moreover, the conventional air conditioner for a vehicle has a still further disadvantage in that air-conditioning performance may be deteriorated since it is difficult to secure air volume if it is difficult to secure the cross-sectional area of the air outlet.

PATENT LITERATURE

Patent Documents

Patent Document: US Patent Publication No. 2017-0253107, published on Sep. 7, 2017.

SUMMARY OF THE INVENTION

Accordingly, the present invention has been made to solve the above-mentioned problems occurring in the prior arts, and it is an object of the present invention to provide an air conditioner for a vehicle which can reduce ventilation resistance and secure a sufficient cross-sectional area of an air outlet to prevent deterioration in air volume.

To accomplish the above object, according to the present invention, there is provided an air conditioner for a vehicle including: an air-conditioning case having an air passageway formed therein and a plurality of air outlets formed at an exit thereof, and at least one heat exchanger disposed in the air passageway of the air-conditioning case to exchange heat with air passing through the air passageway, wherein the air outlet includes a center vent for discharging air-conditioned wind toward the center of a vehicle width and a side vent for discharging the air-conditioned wind toward the side of the vehicle width, and one between the center vent and the side vent is arranged in an upper side of the air-conditioning case, and the other is arranged in one side of the air-conditioning case in a back-and-forth direction of the vehicle.

Moreover, the center vent and the side vent are arranged to adjoin each other based on an edge of the air-conditioning case.

Furthermore, the air outlet includes an indirect vent for indirectly discharging the air-conditioned wind to a passenger, and the indirect vent is arranged in the upper side of the air-conditioning case.

Additionally, the indirect vent, the side vent and the center vent have passages separately formed in the back-and-forth direction of the vehicle.

In addition, the air outlet includes a defrost vent (112) for discharging the air-conditioned wind toward windows of the vehicle, and the indirect vent is arranged between the defrost vent and the side vent.

In another aspect of the present invention, provided is an air conditioner for a vehicle including: an air-conditioning case having an air passageway formed therein and a plurality of air outlets formed at an exit thereof, and at least one heat exchanger disposed in the air passageway of the air-conditioning case to exchange heat with air passing through the air passageway, wherein the air outlet includes a defrost vent for discharging the air-conditioned wind toward windows of the vehicle, a center vent for discharging air-conditioned wind toward the center of a vehicle width, a side vent for discharging the air-conditioned wind toward the side of the vehicle width, and an indirect vent for indirectly discharging the air-conditioned wind to a passenger, and the defrost vent, the indirect vent, the side vent and the center vent are formed from the front toward the rear of the vehicle in order.

In a further aspect of the present invention, provided is an air conditioner for a vehicle including: an air-conditioning case having an air passageway formed therein and a plurality of air outlets formed at an exit thereof, and at least one heat exchanger disposed in the air passageway of the air-conditioning case to exchange heat with air passing through the air passageway, wherein the air outlet includes a center vent for discharging air-conditioned wind toward the center of a vehicle width and a side vent for discharging the air-conditioned wind toward the side of the vehicle width, and the center vent and the side vent are arranged to adjoin each other in the back-and-forth direction of the vehicle, and a single vent door is disposed to adjust the degree of opening of the center vent and the degree of opening of the side vent.

Moreover, one between the center vent and the side vent is arranged in an upper side of the air-conditioning case and the other is arranged in one side of the air-conditioning case in a back-and-forth direction of the vehicle, and the vent door includes a first flat part for opening and closing one between the center vent and the side vent and a second flat part for opening and closing the other.

Furthermore, a bend part is disposed between the first flat part and the second flat part.

Additionally, the vent door has a rotary shaft formed at one side of the second flat part, so that the vent door pivots around the rotary shaft.

In addition, the rotary shaft is arranged at the center vent.

Moreover, a flat surface part is formed at the bent part of the vent door for sealing between the vent door and the air-conditioning case.

Furthermore, the vent door forms a gap when closing the side vent so that air is always discharged to the side vent.

Additionally, the vent door closes a passage of the floor vent when opening the center vent and the side vent to the maximum.

The air conditioner for a vehicle according to the present invention can greatly reduce ventilation resistance since air discharged through the center vent is transferred to the interior of the vehicle without a sharply bent section. Furthermore, the air conditioner for a vehicle according to the present invention can increase air volume by sufficiently securing a cross-sectional area of the air outlet, and reduce the manufacturing cost since one door can regulate the two outlets.

BRIEF DESCRIPTION OF THE DRAWINGS

The above and other objects, features and advantages of the present invention will be apparent from the following detailed description of the preferred embodiments of the invention in conjunction with the accompanying drawings, in which.

DETAILED DESCRIPTION OF THE PREFERRED EMBODIMENT

Hereinafter, with reference to the attached drawings, technical structure and configuration of an air conditioner for a vehicle according to a preferred embodiment of the present invention will be described in detail.

Figure 3:
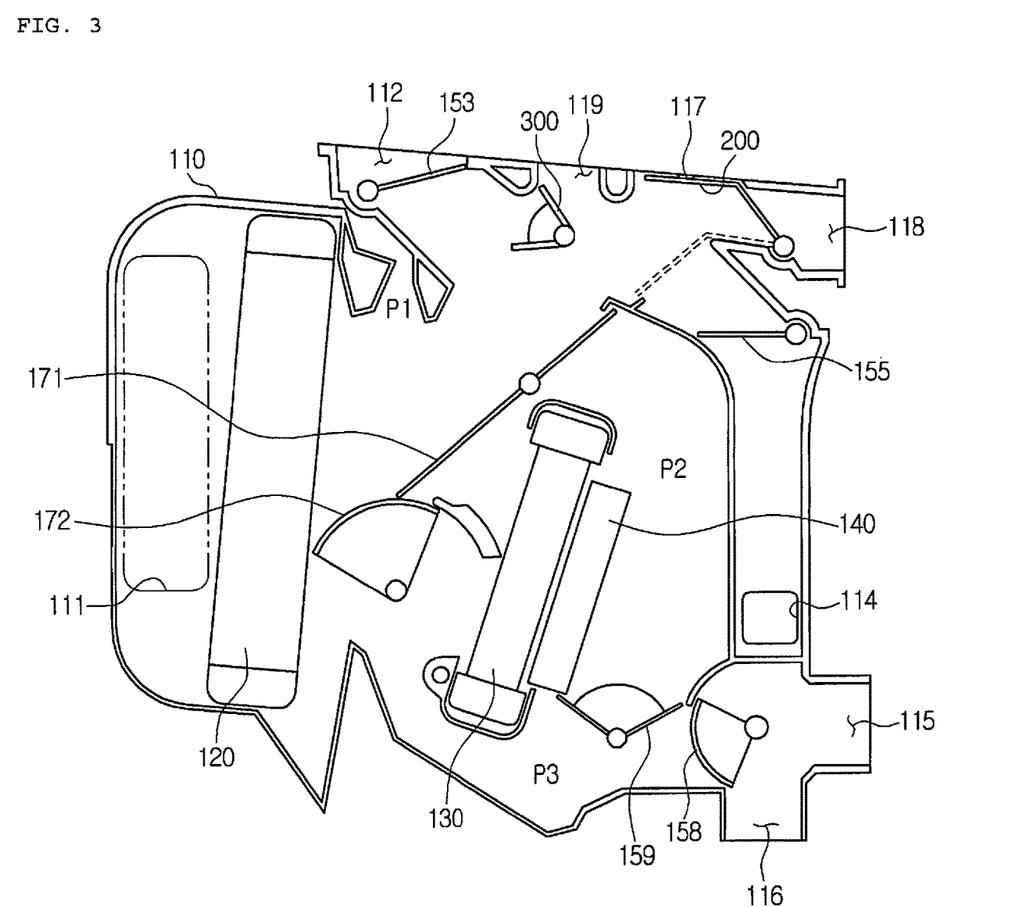
FIG. 3 is a sectional view of an air conditioner for a vehicle according to a preferred embodiment of the present invention.
Figure 4:
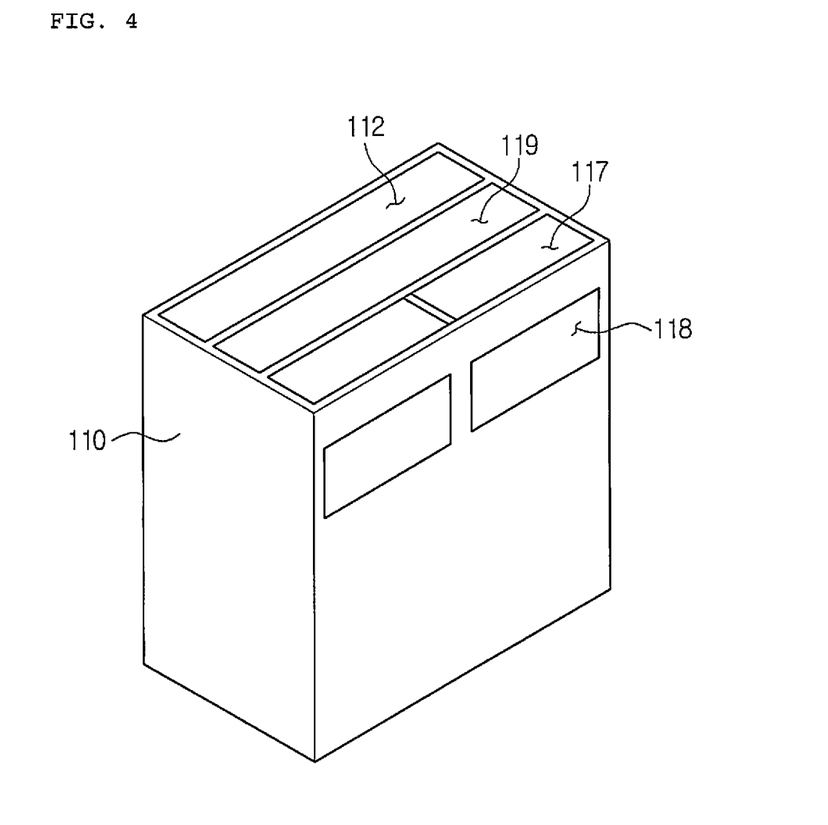
FIG. 4 is a schematically perspective view of an air-conditioning case of the air conditioner for a vehicle according to the preferred embodiment of the present invention.
Figure 5:
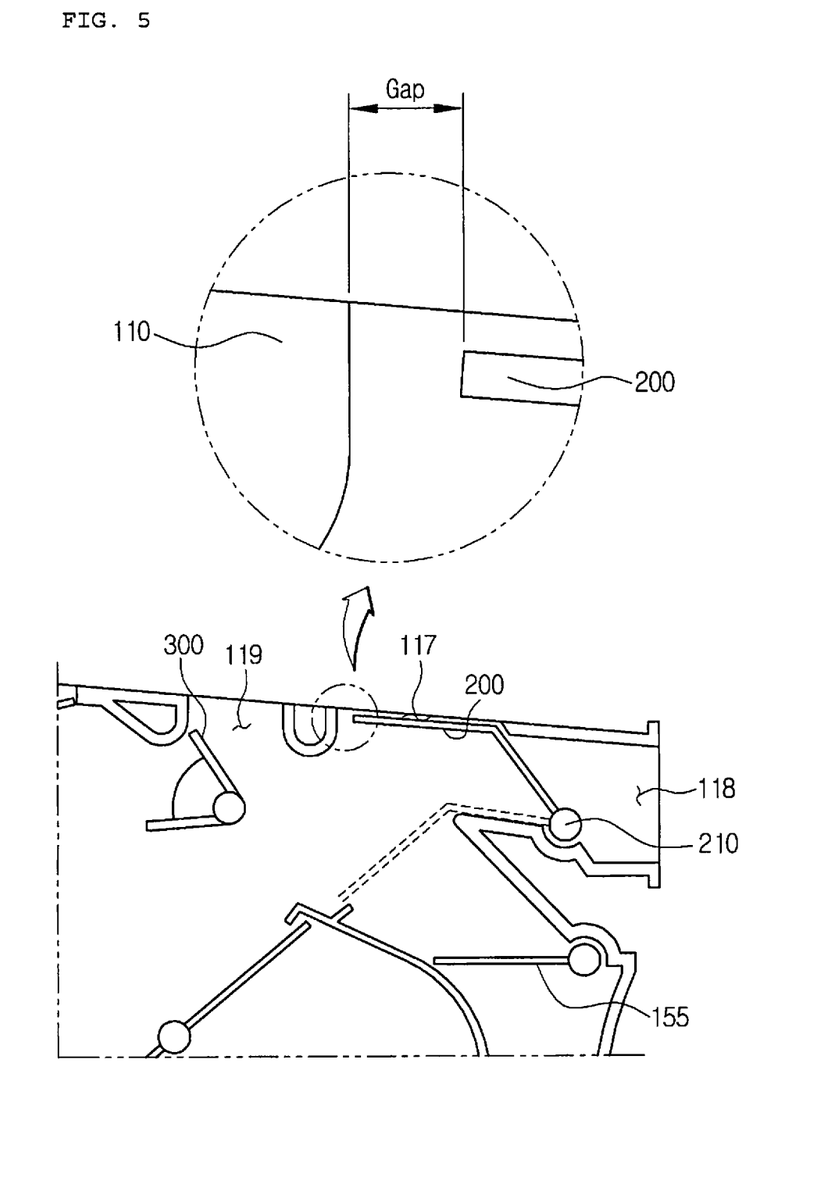
FIG. 5 is an enlarged sectional view of a part of an air outlet of the air conditioner for a vehicle according to the preferred embodiment of the present invention.
Figure 6:
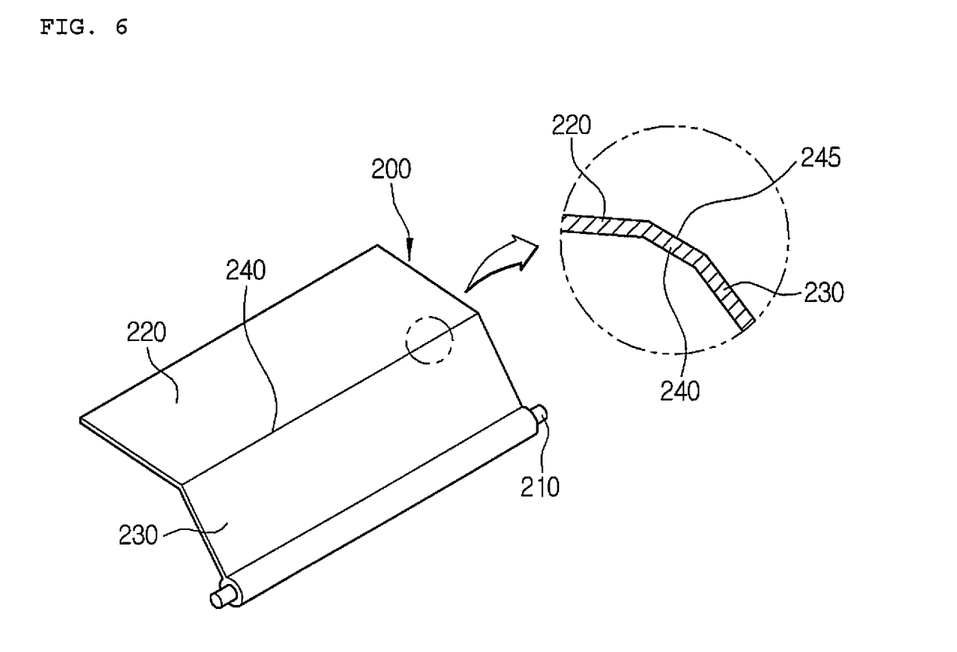
FIG. 6 is a perspective view of a vent door of the air conditioner for a vehicle according to the preferred embodiment of the present invention.

FIG. 3 is a sectional view of an air conditioner for a vehicle according to a preferred embodiment of the present invention, FIG. 4 is a schematically perspective view of an air-conditioning case of the air conditioner for a vehicle; FIG. 5 is an enlarged sectional view of a part of an air outlet of the air conditioner for a vehicle; and FIG. 6 is a perspective view of a vent door of the air conditioner for a vehicle.

As shown in FIGS. 3 to 6, the air conditioner for a vehicle according to the preferred embodiment of the present invention includes: an air-conditioning case 110 having an air passageway formed therein and a plurality of air outlets formed at an exit; and at least one heat exchanger disposed in the air passageway of the air-conditioning case 110 to exchange heat with air passing through the heat exchanger. The heat exchanger includes a heat exchanger for cooling and a heat exchanger for heating.

The air-conditioning case 110 includes an air inlet 111, the plurality of air outlets, and the air passageway formed therein. A blower unit is connected to the air inlet 111 so that indoor air or outdoor air is selectively introduced into the air passageway of the air-conditioning case 110. The air outlets are a front seat air outlet having a defrost vent 112, a face vent and a floor vent 114, and a rear seat air outlet having a console vent 115 and a rear seat floor vent 116.

The heat exchanger for cooling is an evaporator 120. The evaporator 120 cools air by exchanging heat between refrigerant flowing in the evaporator 120 and air passing through the evaporator 120. The heat exchanger for heating is a heater core 130. The heater core 130 heats air by exchanging heat between cooling water flowing in the heater core 130 and air passing through the heater core 130. The heater core 130 is arranged in a warm air passageway P2, which is located downstream of the evaporator 120 in an air flow direction. An electric heater 140, such as a PTC heater, may be further disposed in the warm air passageway P2.

The air passageway of the air-conditioning case 110 includes a front seat cold air passageway P1, the warm air passageway P2, and a rear seat cold air passageway P3. The air passageway located downstream of the evaporator 120 is divided into three, namely, the front seat cold air passageway P1, the warm air passageway P2, and the rear seat cold air passageway P3. The front seat cold air passageway P1, the warm air passageway P2, and the rear seat cold air passageway P3 are formed in order from the top to the bottom, and the warm air passageway P2 is vertically arranged between the front seat cold air passageway P1 and the rear seat cold air passageway P3. The air passing through the evaporator 120 bypasses the heater core 130 of the warm air passageway P2 and flows to the front seat cold air passageway P1 and the rear seat cold air passageway P3, or passes through the heater core 130 of the warm air passageway P2 and flows to the front seat cold air passageway P1 or the rear seat cold air passageway P3.

The front seat cold air passageway P1 is a passage that the air passing through the evaporator 120 bypasses the heater core 130 and flows toward the front seat of the vehicle. The rear seat cold air passageway P3 is a passage that the air passing through the evaporator 120 bypasses the heater core 130 and flows toward the rear seat of the vehicle. The warm air passageway P2 is a passage that the air passing through the evaporator 120 passes through the heater core 130 and flows toward the front seat or the rear seat of the vehicle.

The air-conditioning case 110 has a front seat air outlet for discharging air toward the front seat of the vehicle, and the front seat air outlet is controlled in the degree of opening by a front seat mode door. The front seat mode door includes a defrost door 153 for adjusting the degree of opening of the defrost vent 112, and a floor door 155 for adjusting the degree of opening of the floor vent 114. Moreover, the air-conditioning case 110 has a rear seat air outlet for discharging air toward the rear seat of the vehicle, and the rear seat air outlet is controlled in the degree of opening by a rear seat mode door 158.

The air conditioner for a vehicle according to the present invention includes a front seat temp door 171. The front seat temp door 171 adjusts the degree of opening between the front seat cold air passageway P1 and the warm air passageway P2. The front seat temp door 171 is located downstream adjacent to the evaporator 120, namely, at a boundary part where the front seat cold air passageway P1 and the warm air passageway P2 diverge from each other. Additionally, the air conditioner for a vehicle includes a first rear seat temp door 172, a second rear seat temp door 159, and the rear seat mode door 158.

The first rear seat temp door 172 is arranged between the evaporator 120 and the heater core 130 in order to adjust the degree of opening of another part of the warm air passageway P2. The second rear seat temp door 159 is arranged downstream of the heater core 130 in order to adjust the degree of opening between the warm air passageway P2 and the rear seat cold air passageway P3. The rear seat mode door 158 is arranged downstream of the second rear seat temp door 150 in order to adjust the degree of opening of the rear seat air outlet.

The face vent includes a center vent 118 for discharging air-conditioned air toward the center of the vehicle width, and a side vent 117 for discharging air-conditioned air toward the side of the vehicle width. In addition, the defrost vent 112 is to discharge air-conditioned air toward windows of the vehicle. Moreover, the air outlet has an indirect vent 119 for indirectly discharging air-conditioned air toward a passenger.

Because the passenger may feel unpleasant if the air-conditioned air is directly discharged to the passenger, the indirect vent 119 discharges some of air volume between an outlet of the defrost vent 112 and an outlet of the face vent to indirectly perform air-conditioning. That is, the indirect vent 119 is not to directly blow the air-conditioned wind to the passenger but to indirectly supply the air-conditioned wind, so discharges the air-conditioned wind to another area other than the defrost vent 112, the center vent 118, the side vent 117, and the floor vent 114. As an example, the indirect vent 119 may be formed to discharge the air-conditioned wind toward the ceiling of the vehicle. An outlet of the indirect vent is formed in an instrument panel of a vehicle body.

One between the center vent 118 and the side vent 117 is arranged in an upper side of the air-conditioning case 110, and the other one is arranged in one side of the air-conditioning case 110 in a back-and-forth direction of the vehicle. In this embodiment, the side vent 117 is arranged in the upper side of the air-conditioning case 110, and the center vent 118 is arranged in the front side of the air-conditioning case 110. In this instance, the front side of the air-conditioning case is the side facing the interior of the vehicle.

The center vent 118 and the side vent 117 are arranged to adjoin each other based on an edge of the air-conditioning case 110. Additionally, the indirect vent 119 is arranged in the upper side of the air-conditioning case 110. As described above, because the center vent 118 is formed toward the interior of the vehicle, the air discharged through the center vent 118 can be transferred to the interior of the vehicle without a sharply bent section, so as to greatly reduce ventilation resistance.

As described above, because the side vent 117 and the center vent 118 are separately arranged not in the width direction of the vehicle but in the back-and-forth direction of the vehicle, if the indirect vent is formed, the size of the air outlet for securing air volume can be secured. That is, because the side vent 117 and the center vent 118 are vertically formed and arranged in different sides, the space for the indirect vent 119 can be secured. Moreover, because the center vent 118 is formed in the back-and-forth direction of the vehicle to be arranged closer to the passenger.

The indirect vent 119, the side vent 117 and the center vent 118 have flow passages separately formed in the back-and-forth direction of the vehicle. Therefore, the air conditioner for a vehicle according to the present invention can increase a cross-sectional area of the air outlet of the air-conditioning case. An indirect vent door 300 for adjusting the degree of opening of the indirect vent 119 is mounted at the air-conditioning case 110.

The indirect vent 119 is arranged between the defrost vent 112 and the side vent 117. The defrost vent 112, the indirect vent 119 and the side vent 117 are arranged in the upper side of the air-conditioning case 110, and the center vent 118 is arranged in one side of the air-conditioning case 110. The defrost vent 112, the indirect vent 119, the side vent 117 and the center vent 118 are formed from the front toward the rear of the vehicle in order. The center vent 118 and the side vent 117 are arranged to adjoin each other in the back-and-forth direction of the vehicle.

In comparison with the structure that the indirect vent, the center vent and the side vent are all formed in one side, namely, the upper side of the air-conditioning case, the structure that the indirect vent and the side vent are formed in one side, namely, the upper side of the air-conditioning case, and the center vent is formed in another side, namely, the front side of the air-conditioning case, can increase the cross-sectional area of the air outlet.

For instance, in case of the structure that the indirect vent, the center vent and the side vent are all formed in one side, the gross-sectional area of the air outlet is 20,000 mm$^2$. However, in case of the structure with the optimized arrangement of the vents according to the present invention, the gross-sectional area of the air outlet is about 26,000 mm$^2$, so it has an effect to increase the cross-sectional area by about 30%.

Moreover, because the defrost vent, the indirect vent, the side vent, and the center vent are formed in order in the back-and-forth direction of the vehicle and have flow passages formed separately, the air conditioner for a vehicle according to the present invention van secure a sufficient cross-sectional area of the air outlet without an increase of the width-directional size of the vehicle so as to secure air volume and reduce the size of an HVAC package.

Furthermore, the air conditioner for a vehicle includes a single vent door 200 for adjusting the degree of opening of the center vent 118 and the degree of opening of the side vent 117. The vent door 200 includes: a first flat part 220 for opening and closing one between the center vent 118 and the side vent 117; a second flat part 230 for opening and closing the other one; and a bent part 240 formed between the first flat part 220 and the second flat part 230.

Referring to FIGS. 5 and 6, when the vent door 200 is rotated in the clockwise direction to the maximum as illustrated by the solid line, the first flat part 220 closes the side vent 117 and the second flat part 230 closes the center vent 118. Additionally, when the vent door 200 is rotated in the counterclockwise direction to the maximum as illustrated by the dotted line, the first flat part 220 closes the floor passage, or the first flat part 220 and the second flat part 230 close the floor passage.

Due to the bent part 240, the single door can cover all of the side vent 117 and the center vent 118 formed in different sides, namely, the upper side and the front side of the air-conditioning case, and if a bent angle of the bent part 240 is changed properly, the door can be actuated properly according to an angle and a separation distance between the side vent 117 and the center vent 118.

As described above, in order to adjust the degree of opening of the two outlets (of the center vent and the side vent) using the one vent door 200, a bent structure is applied to the middle of the door and a pivot is formed at one side of the door. That is, the vent door 200 has a rotary shaft 210 formed at one side of the second flat part 230, and the vent door 200 pivots around the rotary shaft 210. Therefore, the air conditioner for a vehicle according to the present invention can lower load and price by reducing the number of the doors.

In this instance, the rotary shaft 210 is arranged at the center vent 118. A flat surface part 245 is formed at the bent part 240 of the vent door 200 for sealing between the vent door and the air-conditioning case 110. Therefore, as shown in FIG. 5, when the vent door 200 rotates in the clockwise direction to the maximum to close all of the center vent 118 and the side vent 117, the flat surface part 245 gets in contact with a sealing surface of the air-conditioning case 110 to perform sealing, thereby preventing air leak. A rubber member may be added to the flat surface part 245.

Furthermore, when the vent door 200 closes the side vent 117, a gap is formed so that air is always discharged to the side vent 117. Additionally, as illustrated by the dotted line of FIG. 5, when the vent door 200 opens the center vent 118 and the side vent 117 to the maximum, the passage of the floor vent 114 is closed. Therefore, due to the nature of the vent door that the one door opens and closes the two outlets, the length of the vent door is relatively enlarged, but since the vent door closes the passage of the floor vent, flow resistance and noise can be reduced.

Figure 8:
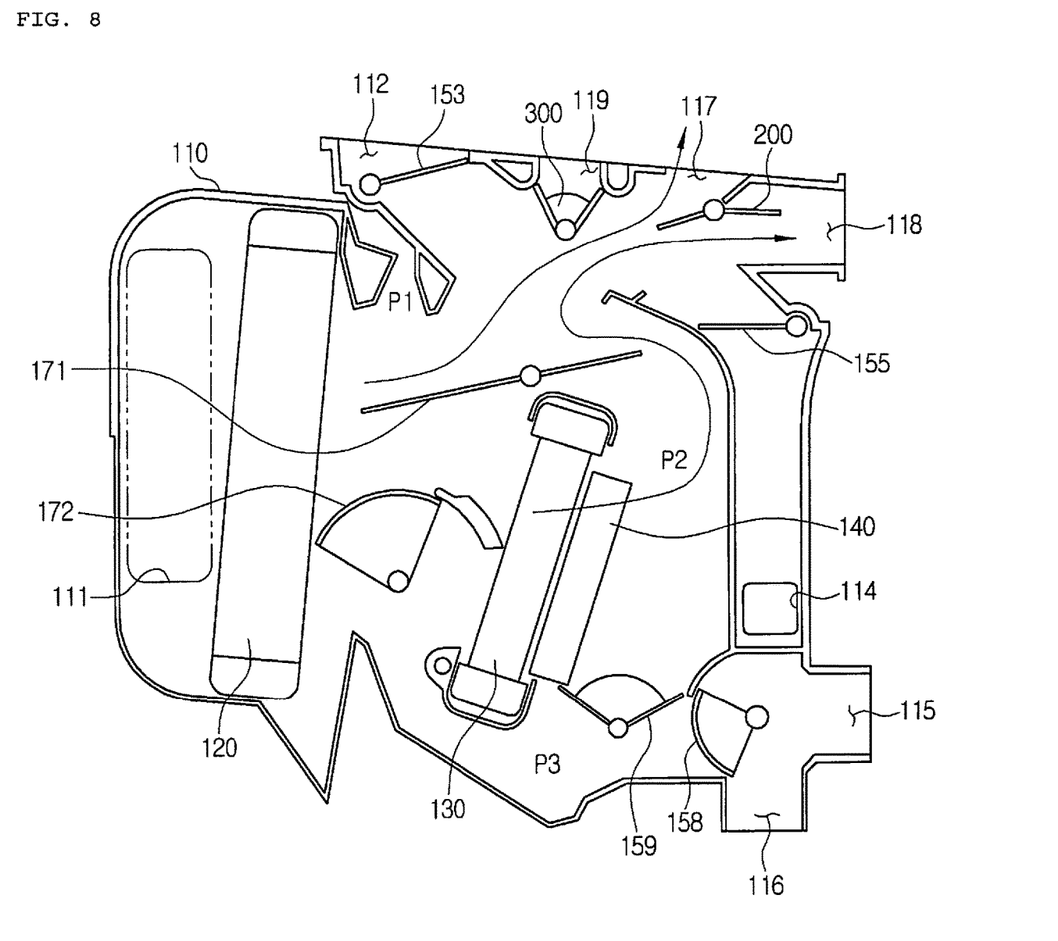
FIG. 8 is a sectional view of an air conditioner for a vehicle according to a modification of FIG. 3.

In the meantime, FIG. 8 is a sectional view of an air conditioner for a vehicle according to a modification of FIG. 3. Referring to FIG. 8, the vent door 200 may be formed in a center pivot type that a rotary shaft is formed at the center of the door. However, in this instance, as shown in FIG. 8, because one side of the door functions as a partition wall which interrupt mixing between cold air passing through the evaporator 120 and warm air passing through the heater core, it becomes a cause to hinder temperature uniformity by reducing a temperature mixing zone.

So, through the structure that the vent door 200 has the rotary shaft at the center vent 118, the center vent and the side vent branches off in the same flow passage line so as to sufficiently secure the temperature mixing zone and enhance temperature uniformity.

Figure 7:
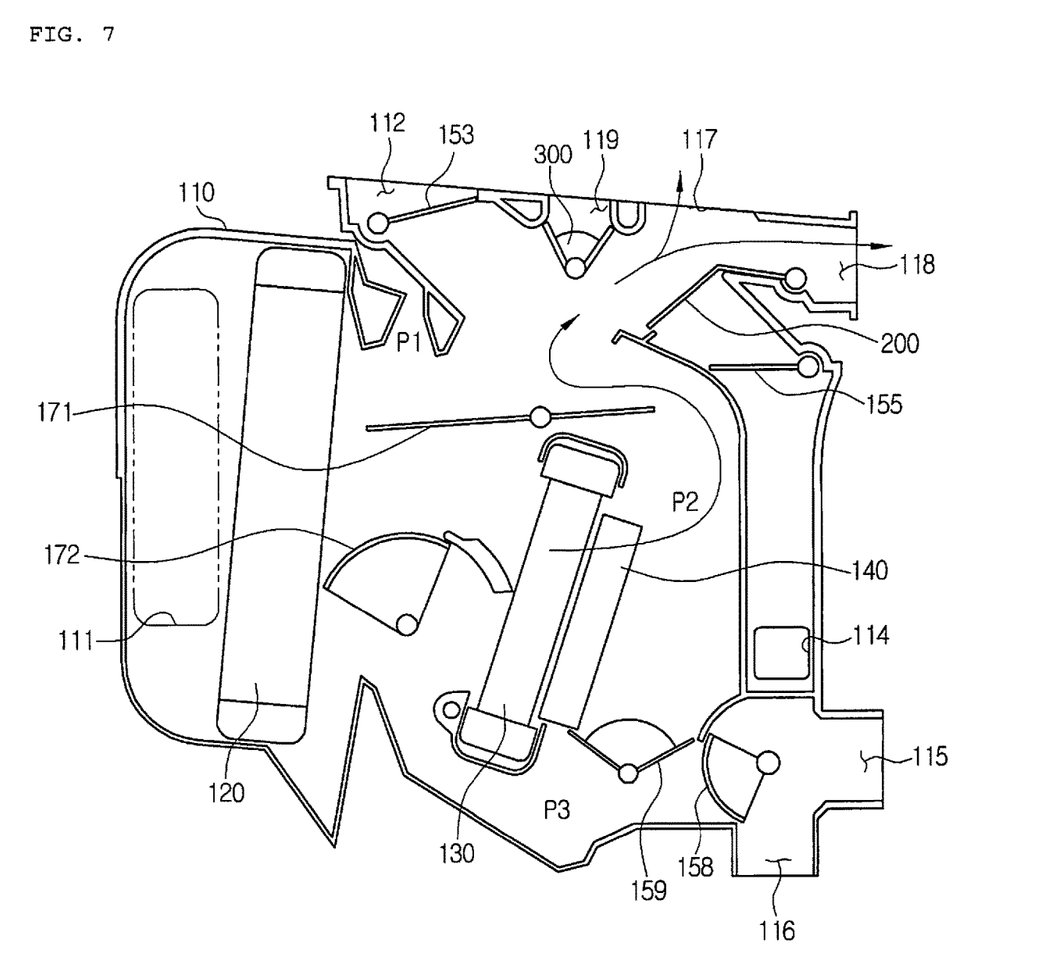
FIG. 7 is a view showing an example of operation of the air conditioner for a vehicle according to the preferred embodiment of the present invention.

FIG. 7 is a view showing an example of operation of the air conditioner for a vehicle according to the preferred embodiment of the present invention. Referring to FIG. 7, some of the air passing through the evaporator 120 bypasses the heater core 130, and some of the air flows to the warm air passageway P2, passes through the heater core 130 and the electric heater 140, and then, is discharged to the side vent 117 and the center vent 118.

In this instance, the first rear seat temp door 172 opens the warm air passageway P2. The front seat temp door 171 partially opens the warm air passageway P2 to mix the cold air and the warm air together. The second rear seat temp door 159 closes a communication passage between the warm air passageway and the rear seat cold air passageway. In addition, the rear seat mode door 158 closes the rear seat air passageway.

Moreover, the defrost door 153 closes the defrost vent 112, and the indirect vent door 300 closes the indirect vent 119. The vent door 200 rotates in the counterclockwise direction to the maximum to close the passage of the floor vent 114.

While the present invention has been particularly shown and described with reference to exemplary embodiments thereof, it will be understood by those of ordinary skill in the art that various modifications and equivalents may be made without deviating from the spirit or scope of the invention. Therefore, it would be understood that the technical and protective scope of the present invention shall be defined by the technical idea as defined by the following claims and the equivalences.

What is claimed is:

1. An air conditioner for a vehicle comprising:
    an air-conditioning case having an air passageway formed therein and a plurality of air outlets formed at an exit thereof, and at least one heat exchanger disposed in the air passageway of the air-conditioning case to exchange heat with air passing through the air passageway,
    wherein the plurality of air outlets includes a center vent for discharging air-conditioned wind toward a center of a vehicle width and a side vent for discharging the air-conditioned wind toward a side of the vehicle width,
    wherein the air outlet includes an indirect vent for indirectly discharging the air-conditioned wind to a passenger, and the indirect vent is arranged in the upper side of the air-conditioning case,
    wherein the air outlet includes a defrost vent for discharging the air-conditioned wind toward windows of the vehicle,
    wherein the defrost vent, the indirect vent, the side vent and the center vent are formed in order in a back-and-forth direction of the vehicle and have flow passages separately formed in the back-and-forth direction of the vehicle, thereby increasing a cross sectional area of the air outlet, and
    wherein the defrost vent, the indirect vent and the side vent are arranged in an upper face of the air-conditioning case, and the center vent is arranged in a front surface facing the vehicle interior of the air-conditioning case in the back-and-forth direction of the vehicle,
    wherein the center vent and the side vent are arranged to adjoin each other in the back-and-forth direction of the vehicle, and
    wherein a single vent door is disposed to adjust a degree of opening of the center vent and a degree of opening of the side vent,
    wherein one of the center vent and the side vent is arranged in an upper side of the air-conditioning case and the other of the center vent and the side vent is arranged in one side of the air-conditioning case in the back-and-forth direction of the vehicle, and
    wherein the single vent door includes a first flat part for opening and closing one of the center vent and the side vent and a second flat part for opening and closing the other of the center vent and the side vent.

2. The air conditioner according to claim 1, wherein the center vent and the side vent are arranged to adjoin each other.

3. The air conditioner according to claim 1:
    wherein the defrost vent, the indirect vent, the side vent and the center vent are formed from a front toward a rear of the vehicle in order.

4. The air conditioner according to claim 1, wherein a bend part is disposed between the first flat part and the second flat part.

5. The air conditioner according to claim 4, wherein the single vent door has a rotary shaft formed at one side of the second flat part, so that the vent door pivots around the rotary shaft.

6. The air conditioner according to claim 5, wherein the rotary shaft is arranged at the center vent.

7. The air conditioner according to claim 4, wherein a flat surface part is formed at the bent part of the single vent door for sealing between the vent door and the air-conditioning case.

8. The air conditioner according to claim 1, wherein the single vent door forms a gap when closing the side vent so that air is always discharged to the side vent.

9. The air conditioner according to claim 1, wherein the single vent door closes a passage of a floor vent when opening the center vent and the side vent to a maximum.

* * * * *